March 31, 1925.

S. EBERLY

BOTTLE WASHER

Filed Dec. 30, 1918

Inventor
Sylvester Eberly
By Geo E Kirk
Attorney

March 31, 1925.
S. EBERLY
1,531,546
BOTTLE WASHER
Filed Dec. 30, 1918
2 Sheets-Sheet 2
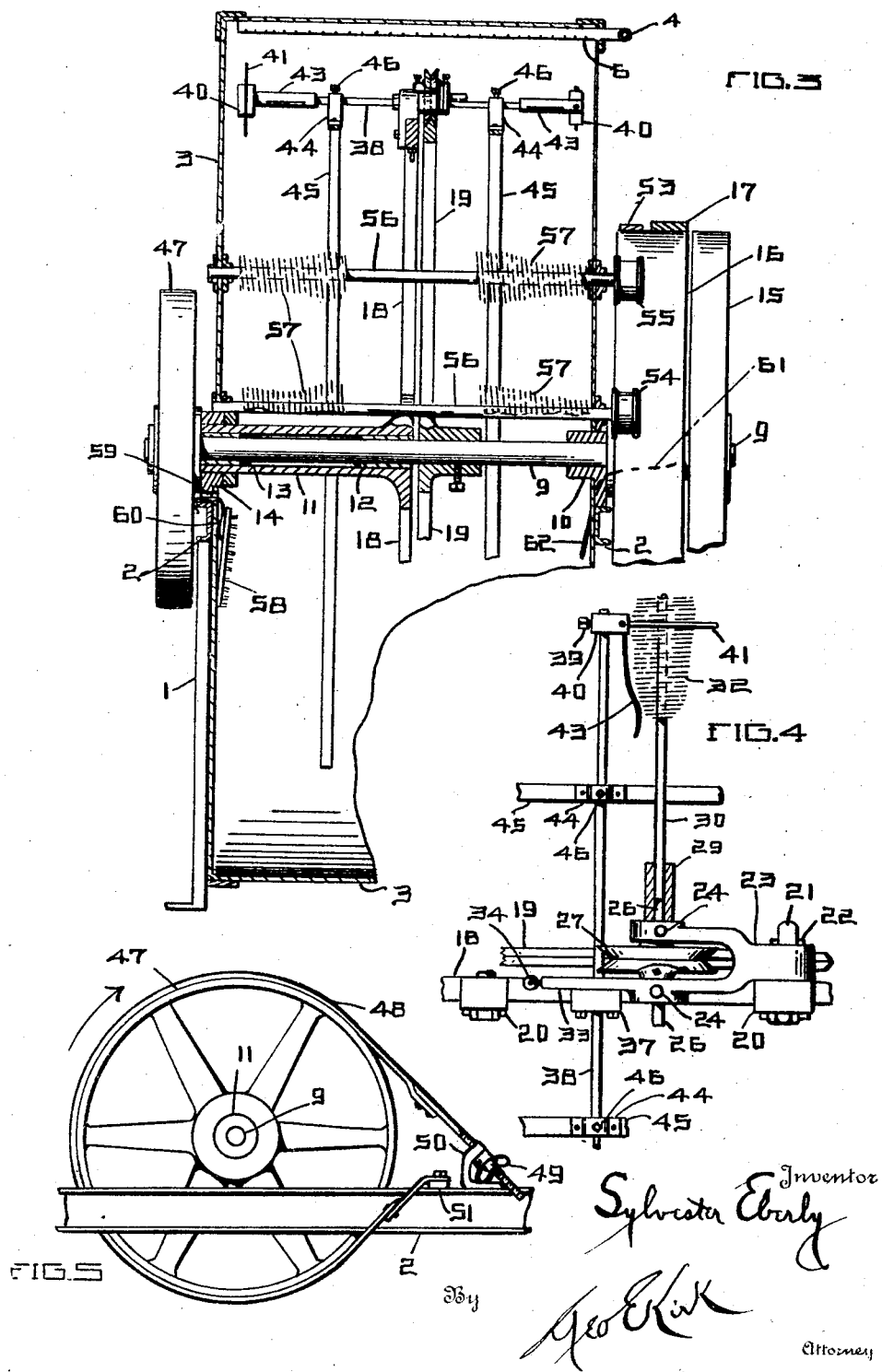

Patented Mar. 31, 1925.

1,531,546

UNITED STATES PATENT OFFICE.

SYLVESTER EBERLY, OF MORENCI, MICHIGAN, ASSIGNOR OF ONE-HALF TO HOWARD S. MELLOTT, OF MORENCI, MICHIGAN.

BOTTLE WASHER.

Application filed December 30, 1918. Serial No. 268,841.

*To all whom it may concern:*

Be it known that I, SYLVESTER EBERLY, a citizen of the United States of America, residing at Morenci, Lenawee County, Michigan, have invented new and useful Bottle Washers, of which the following is a specification.

This invention relates to cleaners or washers, especially for multiple service containers, as milk bottles.

This invention has utility when incorporated in scrubbers of power driven, continuous rotary type, with advantages of simplicity and low installation cost, together with low power operation expense and low maintenance charges.

Referring to the drawings:

Fig. 3 is a fragmentary transverse view of the housing or reservoir of the washer;

Fig. 4 is a fragmentary plan of the interior scrubbers; and

Fig. 5 is a detail view of the carrier rotation control brake.

Figure 1:
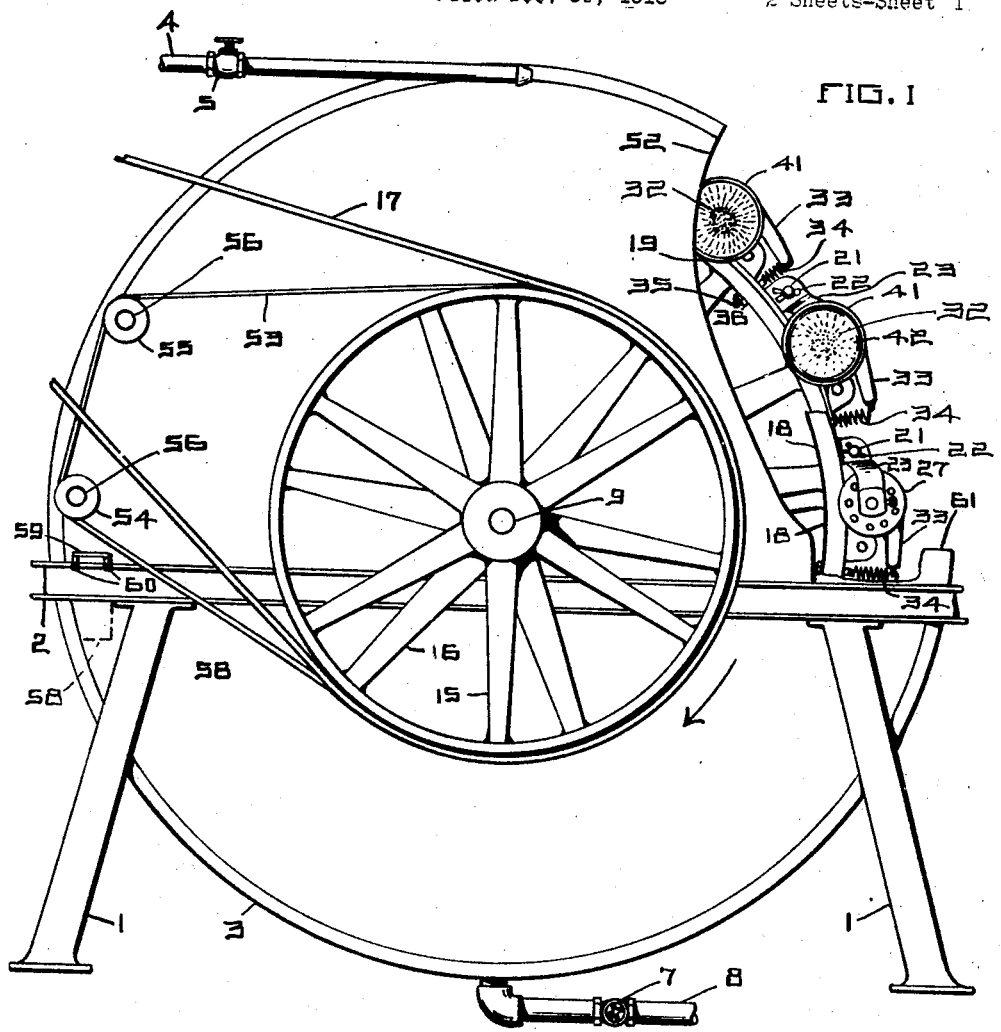
Fig. 1 is a side elevation, with parts broken away, of an embodiment of the device in a rotary bottle washer as designed for milk bottles.
Figure 2:
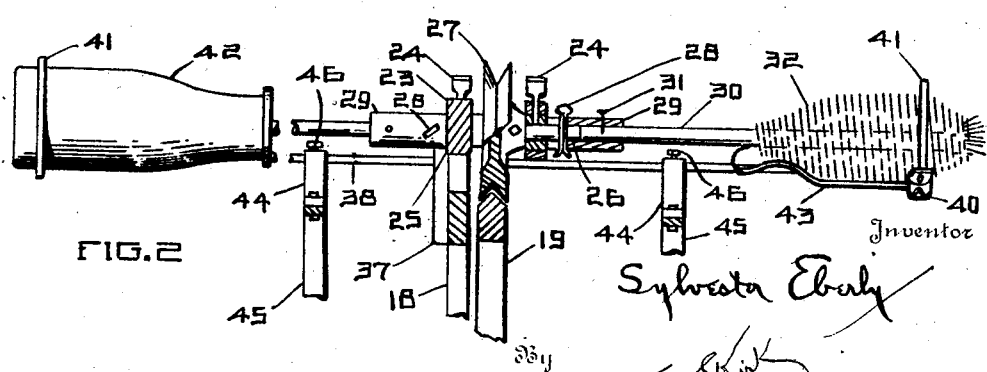
Fig. 2 is a detail of the interior scrubbers and the drive therefor.

The legs 1 may mount a frame 2 carrying a drum or reservoir housing 3 as a tank, which may be supplied with washing liquid from line 4, with the flow controlled by valve 5, as a rinsing spray from perforate pipe 6 (Fig. 3) in the region of the scrubbed bottle travel near the top of the tank or reservoir 3. The height of the liquid in the reservoir may be regulated by valve 7 in discharge line 8 from the bottom of the reservoir 3 (Fig. 1).

Centrally of this drum tank 3 is mounted shaft 9 carried by bearing 10 from the frame 2 at one side of the housing 3, while it is disposed in sleeve 11, having bearings 12, 13, therewith, adjacent the other side of the housing 3, this sleeve 11, having bearing 14 carried by the frame 2.

Mounted on the shaft 9 is loose pulley 15 and fast pulley 16, adjacent the housing 3. Shifting of driving belt 17 from loose pulley 15 to driving pulley 16 actuates the washer.

The sleeve 11 is really an elongated hub for a spider or carrier wheel 18, disposed centrally in the housing 3, adjacent wedge friction drive wheel 19 fast on the shaft 9. The carrier 18 peripherally carries an annular series of brackets 20 (Fig. 4) for pivot pins 21 upon which may be held by split keys 22, radially movable arms 23. The arms 23 are offset fork in form and are provided with grease cups 24 for bearings 25 in which is mounted spindle 26 to which is keyed grooved roller 27 in the plane of the wedge of the wheel 19.

Split keys 28 through sleeves 29 may detachably mount stems 30 to rotate with the rollers 27, as the grooves of such rollers coact with the more blunt wedge of the wheel 19 on the drive shaft 9. Tacks or small nails 31 driven into the wooden stems 30 through openings in the sleeves 29 may serve to mount the brushes for ready removal. The free ends of the stems 30 are shown as carrying container interior scrubbers or bristle brushes 32. In adapting the washer to different sizes of containers or bottles, keys 28 may be withdrawn. When the brushes become worn, the sleeves 29 may be retained and only the brush 32 with its stem 30 discarded, by withdrawing the tacks 31.

Each arm 23 has extension 33 with which helical spring 34 connects and extends to adjustable stem 35 through the wheel 18 for frictional contact regulation as to the wheel 19, by setting nut 36. This provides an independent adjustment for each roller 27, not only for taking up wear, but regulating the speeds.

Adjacent the rollers 27, the wheel or carrier 18 has brackets 37 for rods 38 adjacent the free ends of which, by set screws 39, brackets 40 may be adjustably or removably mounted thereon. Each bracket 40 has two eyes through which a hook bend may be given the ends of wire rings 41 as auxiliary guides or steadying means for interior scrubber supported bottles 42. The positioning of such bottle 42 axially shifted to position, is yieldably determined and thus maintained by the strap spring member 43 inwardly extending from the bracket 40. The effectiveness of this steadying means or guide is enhanced by imparting additional rigidity thereto by intermediate brackets 44, riveted to rings 45 and held in position longitudinally of the rods 38 by set screws 46. The washer is compact for simultaneous washing of two series of containers, and the rods 38 extend through the brackets 37 to serve as guides and steady means for each series of scrubber supported bottles. The rings 45 are disposed to just clear the top of the size of bottle being washed, thus affording a maximum of rigidity to the apparatus, as so adjusted by the set screws 46.

The continuity of the washing operations as a cycle of travel is readily adjusted for automatic maintenance at the desired speed from the single driving source or pulley 16. As herein disclosed it is a lag of the wheel 18 from the friction driving means of the wheel 19 as rotating the interior scrubbers or brushes 32, and as a lag is a component thereof transmitted therethrough to the carrier 18. The driving action effecting rotation of the scrubbers 32, has a tendency to pull along the carrier 18 having the extension hub or sleeve 11 with bearings 12, 13, thus normally readily permitting rotation of the carrier 18 were such carrier 18 not retarded. The sleeve 11 has mounted thereon, outside the housing 3 on the opposite side from the pulleys 15, 16, a brake drum 47 about which extends brake band 48, adjusted by wing nut 49 coacting with bracket 50 mounted on the frame 2. The other end of this leather belt section brake band 48 is fixedly anchored to the frame 2 by bracket 51. By shifting the nut 49, the band 48 may be given the desired engaging action as to the drum 47. There is thus frictional retarding of the wheel 18 to insure rotation of the brushes 32 with some slippage as to the band 48 at such rate as is desired for the rotation of the wheel 18. With the supports distributed to provide say mounting space for fifteen bottles in each annular series, say on a 50" diameter wheel, for up to quart milk bottles, the housing may be 30" long and 60" inside diameter, and the carrier so retarded as to travel as slow as 1 R P M. However this speed may be increased by slackening the band 48 as the skill of the operators permit of more rapid removal and placing of the bottles at the charging station or opening 52.

This lag drive, besides providing a simple and economical mode for adjusting the machine capacity from a one speed drive source without involving any complex parts, effects both the initial and auxiliary driving with entire absence of parts passing through the wash which may be deleteriously affected thereby. Furthermore, there is a minimum of power consumption in operation due to the few relatively moving parts and the direct drive or simplicity of the transmission. Again, due to this character of structure, there are not parts to give out with expense of holding up use of the apparatus and replacement costs. These drives take care of the internal cleansing or scrubbing and the cycle of operations.

For external cleansing or scrubbing, there is drive from the common source, or pulley 16. This pulley 16 is wider than the belt 17 and carries belt 53 extending over pulleys 54, 55, on shafts 56 extending through the housing 3 in the region of bottle ascent from the washing liquid, and disposed with brushes 57 thereon configured to scrub the exterior of the containers, during their lagging rotation on the interior brushes 32. The lagging rotation of the bottles, with the relatively high speed of the brushes 57 spaced so that two brushes 57 act on each bottle insures a thorough exterior scrubbing of each bottle.

Further, in the ascent region, a removable spring thrown or yieldable inclined brush 58 contacts the bottle base or bottom to remove foreign matter therefrom. This brush 58 is readily inserted into the housing 3 through opening 59 and its spring 60 presses it against the bottle bottom.

In operating the apparatus, the belt 17 is shifted upon the fast or driving pulley 16, the wash water or cleansing solution is in the housing well up in the lower portion thereof for submerging the bottles during a considerable portion of the interior scrubbing thereof. At station 52, the cleansed bottle coming over the top is removed from the holding snap 43 and support 32, and immediately a bottle to be cleaned is placed in position on the slowly traveling support 32, being thrust thereover to be engaged and steadied by the spring 43, while embraced by the ring 41. Should this charging not force the bottle fully home, slop receiving platform 61 has incline or cam 62 therefrom directing the bottle to slide further over the brush 32 as it enters the tank portion proper of the housing 3. The drive pulley 16 rotates the friction wheel 19 and spins the brushes 32 in the bottles 42 as they travel downward into the housing 3 at the speed regulated by the brake band 48 in the lag travel of the carrier 18. Upon emerging from the solution, bottom wiping brush 58 comes into play, and then the exterior scrubbers 57 as driven by the belt 53. With a spray from the perforate pipe 6, the washed bottles may be rinsed at the top of the housing 3 before removal at the station 52.

Inasmuch as the cycle travel or lag drive is frictional and of just sufficient holding force to maintain the adjusted speed, in itself it is a safety device automatically stopping its own travel should the operator's hand not be removed in ample time, or should a bottle in some way break or become out of place. In the latter instance, the bottle could be saved from shattering and thus requiring a clearing out of the reservoir. This safety feature is of importance in speeding up the machine for capacity handling with unskilled help.

What is claim and it is desired to secure by Letters Patent is:

1. A washer comprising a washing liquid reservoir, a frame, a carrier mounted in the frame to rotate in the reservoir and having a horizontal axis, said carrier having an annular series of bearings, an annular series of container scrubbers mounted in said bearings of the carrier, driving means for rotating the scrubbers in the bearings and for rotating said carrier, engaging means between the carrier and frame coacting in determining the rate of rotation of the carrier, and means for adjusting the engaging means to vary the speed of the carrier.

2. A washer comprising a housing, an axially fixed rotatable carrier therein provided with bearings, a frame for mounting the carrier, a plurality of container entering scrubbers mounted in the bearings on the carrier, driving means for rotating the scrubbers in said bearings and for rotating said carrier, and carrier speed determining means between the carrier and frame including adjustable friction means for controlling the rate of rotation of the carrier.

3. A washer comprising a reservoir, an axially fixed rotatable carrier having bearings, said carrier being mounted partially surbmerged in said reservoir, container interior scrubbers mounted in the bearings of the carrier, container exterior axially fixed rotary scrubbers, eccentric of said carrier disposed to attack containers traveling from submergence in said reservoir and a common drive rotating the interior and exterior scrubbers and carrier.

4. A washer comprising a housing, an axially fixed rotatable carrier therein, bottle entering scrubbers rotatably mounted on said carrier and fixed relatively thereto against other motion than rotation, and direct driving means for rotating the scrubbers, said driving means embodying control mechanism between the carrier and frame including friction connection allowing the carrier to lag from said driving means.

5. A washer comprising a housing, a carrier therein providing bearings, scrubbers rotatably mounted in the bearings of the carrier, the axes of the carrier and scrubbers being parallel and fixed against longitudinal movement, actuating means for rotating the scrubbers, and control coacting means between the carrier and frame for affecting the speed of the carrier.

6. A washer comprising a housing, a carrier therein, radially movable arms pivotally mounted on the carrier, rotatable scrubbers mounted in said arms, and an adjustable friction drive for the arm carried scrubbers.

7. A washer comprising a housing, a carrier therein, an annular series of arms pivotally mounted on the carrier, grooved rollers carried by the arms, scrubbers actuated by said rollers, a wedge driver coaxial with the carrier for rotating the rollers, and arm adjusting means for regulating the roller coaction with the driver.

In witness whereof I affix my signature.

SYLVESTER EBERLY.